Figure 1:
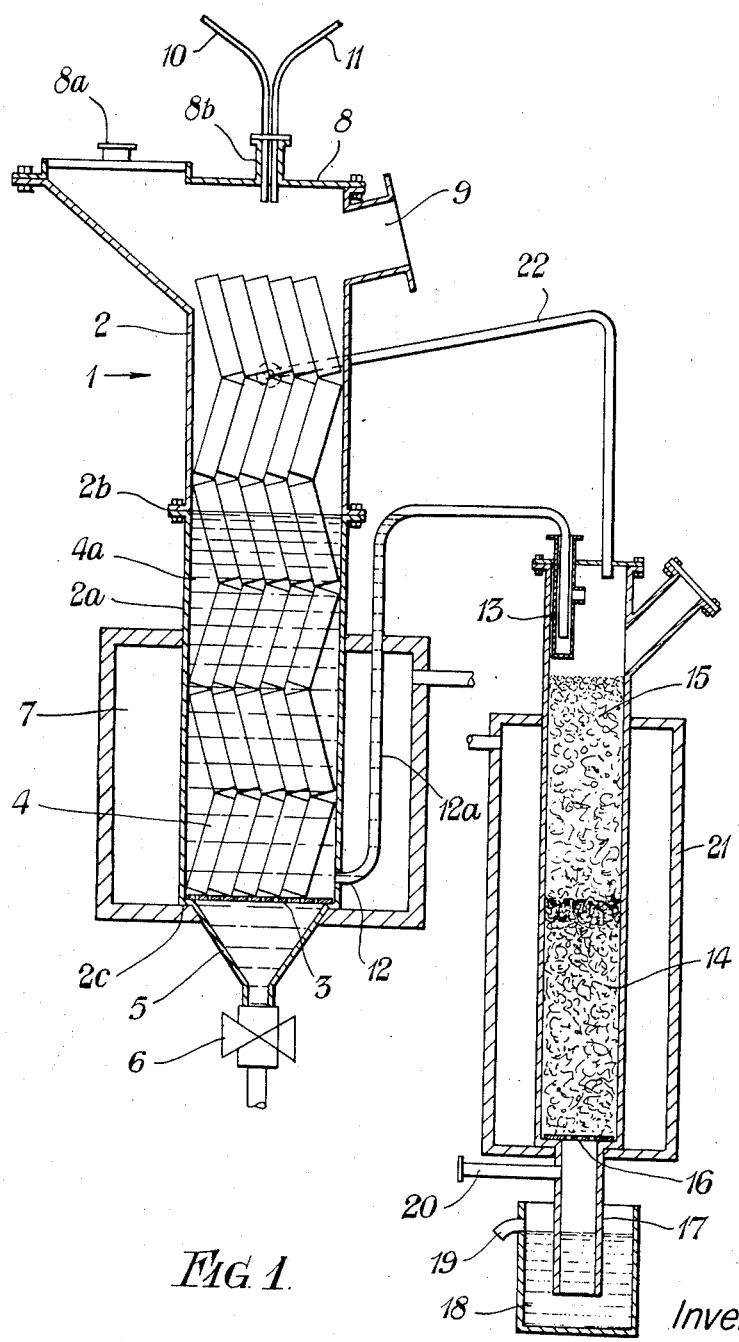

Jan. 8, 1952 T. CRITCHLEY 2,581,519
MANUFACTURE OF METAL NITRATES
Filed Feb. 17, 1948 2 SHEETS—SHEET 1

Inventor
Thomas Critchley
By his attorneys
Howson and Howson

Jan. 8, 1952 T. CRITCHLEY 2,581,519
MANUFACTURE OF METAL NITRATES
Filed Feb. 17, 1948 2 SHEETS—SHEET 2

Inventor
Thomas Critchley
By his attorneys
Howson and Howson

Patented Jan. 8, 1952

2,581,519

UNITED STATES PATENT OFFICE 2,581,519

MANUFACTURE OF METAL NITRATES

Thomas Critchley, Brimsdown, Enfield, England, assignor to Johnson & Sons' Smelting Works Limited, Enfield, England, a British company Application February 17, 1948, Serial No. 8,825
In Great Britain March 8, 1946

3 Claims. (Cl. 23—102)

This invention relates to improvements in and relating to the manufacture of metal nitrates by the reaction of nitric acid with a metal, such as silver or bismuth.

One object of the invention is to provide an improved method of carrying out the reaction which is simple to operate and more economical than existing methods.

A further object is to provide a method by which substantially the whole of the nitric acid is utilised in the reaction to form the nitrate of the metal and to enable a relatively low acidity nitrate to be obtained.

A still further object is to provide a method whereby the reaction takes place in an atmosphere of oxygen or a gas consisting mainly of oxygen.

Another object is to enable the reaction to take place initially over a localised portion of the surface of a column of metal and, to maintain the acid in contact with said surface portion for a time sufficient to allow of substantially the whole reaction to take place thereat.

In my co-pending applications Serial Nos. 8,823 and 8,824, filed February 17, 1948, the latter now abandoned, I have disclosed respectively a process for the disposal of fumes of nitrogen oxides evolved during a chemical reaction and a process for the manufacture of silver or bismuth nitrate.

The present application is concerned solely with a method of obtaining maximum utilization of the acid, particularly in cases where the metal to be reacted is in the form of a column of bars and has for its purpose to delay the passage of the acid over the bars for a predetermined time, so as to ensure a period of contact of the acid with the metal comparable to that obtainable when a column of granular or nodular metal is used. The process is applicable for use with any metal which, on reaction with nitric acid, gives rise to the evolution of the higher oxides of nitrogen.

In its broadest aspect, therefore, my improved process of manufacturing a metal nitrate comprises essentially causing the reaction to take place in an atmosphere of oxygen or a gas consisting mainly of oxygen initially over a localised portion of the surface of a column of metal and so regulating the supply of acid to and the flow thereof over the column that substantially the whole of the introduced acid reacts with the metal to form the nitrate of the metal during the said initial reaction, any acid, remaining unutilised, being subsequently substantially wholly utilised to form additional nitrate and collecting the nitrate solution formed as a result of the reaction.

A yet further object of the invention is to provide a novel arrangement of apparatus for carrying out my improved method which is of simple construction and occupies the minimum of space.

Figure 2:
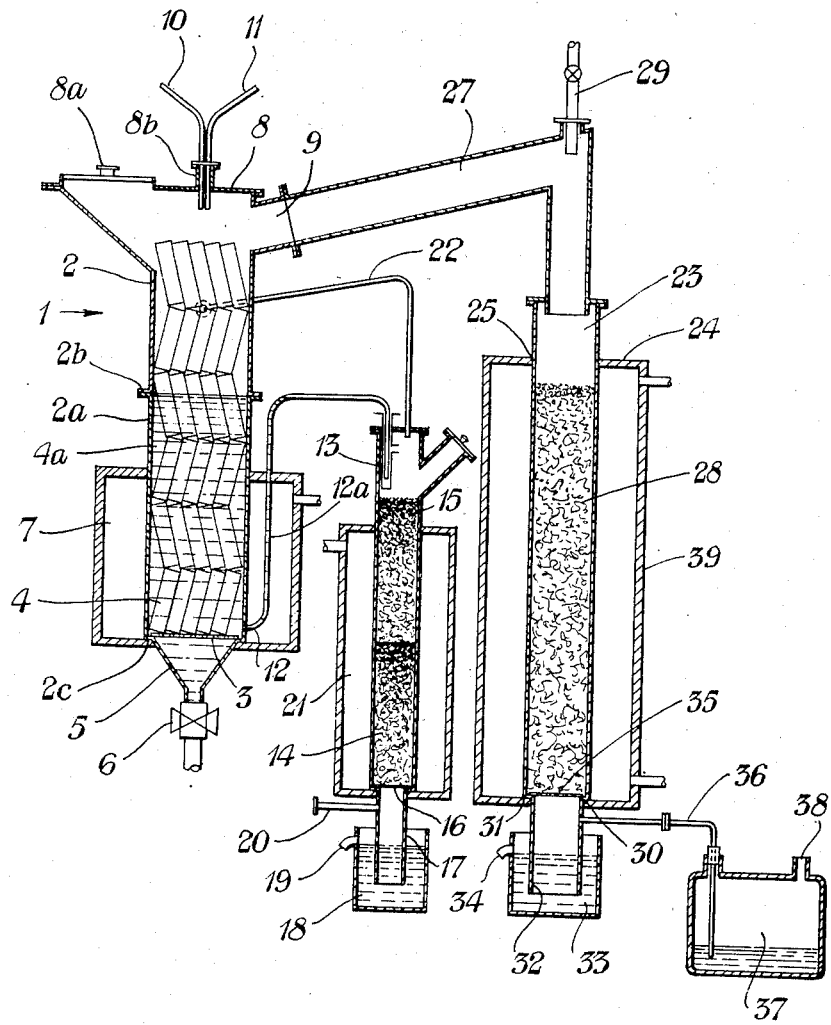

The manner in which the above and other objects are attained will be more readily understood by reference to the following detail description taken in conjunction with the accompanying diagrammatic drawings, of which Figure 1 is a sectional elevation of apparatus constructed in accordance with my invention for carrying out my improved process of manufacturing a metal nitrate, and Figure 2 shows the apparatus of Figure 1 in association with apparatus for recovering, in the form of nitric acid, any oxides of nitrogen which may not have been regenerated during the reaction.

Referring now to the drawing, and first to Figure 1 thereof, the apparatus comprises a tubular reaction tower 1 of stainless steel formed of an upper portion 2 and a lower portion 2a bolted together at 2b. The lower portion 2a is formed with a ledge 2c, supporting a perforated or meshed disc 3 on which rest bars 4 of metal, in this instance, silver. Secured to the lower end of the reaction tower 1 is a conical extension 5, provided with a tap 6. The lower portion 2a of the tower 1 is surrounded for a portion of its length by a heating jacket 7, which may be heated in any suitable manner, for example, by the circulation of steam or hot water therethrough, and the upper end of the portion 2 is closed by a cover plate 8. An outlet 9 is provided adjacent the upper end of the tower to allow of the escape of any fumes of oxides of nitrogen, evolved during the reaction and not reconverted into nitric acid, which fumes may be passed to any means for disposing of the said fumes. The cover plate 8 is provided with a charging opening 8a and a further opening 8b through which pass a pipe 10 for the supply of nitric acid and a pipe 11 for the supply of oxygen. An outlet pipe 12 also leads from a point adjacent the lower end of the portion 2a of the tower 1 and is formed with a rising portion 12a, the height of which is determined by the height of liquid in the tower and enters the upper end of an auxiliary tube 13 containing a lower layer of inert material 14, and an upper layer of granulated silver 15, supported on a perforated plate 16. A depending outlet pipe 17 is located beneath the tube 13 leading to a collecting vessel 18 for the silver nitrate formed, which is withdrawn through the outlet 19. A pipe 20 for the supply of oxygen to the tube 13 is located in the side of the pipe 17. The tube 13 is surrounded by a water jacket 21, heated in any suitable manner, such as steam or a thermostatically controlled immersion heater. A pipe 22 leads from the top of the tube 13 to the upper tower portion 2.

In the use of the apparatus for the manufacture of silver nitrate, the lower portion 2a of the tower 1 is first filled with bars of silver 4, the upper portion 2 is then bolted in place and further bars inserted. A cold silver nitrate solution 4a is then introduced until it overflows through the pipe 12 into the tube 13 and so as partly to immerse the silver bars 4. The cover 8 is then fitted in place.

The reaction tower 1 and the auxiliary tube 13 are now initially heated to a temperature of about 80° C. and during this time, oxygen is admitted to the tower 1 and the tube 13 to expel all air therefrom. Nitric acid of suitable specific gravity e. g. 1.25–1.30 is then introduced through the pipe 10, at the rate of 280 cc./hr./sq. in. of surface area of the base of the column and, by the impingement thereon of the entering oxygen, is formed into a spray.

The nitric acid, in the presence of the oxygen, comes initially into contact with the silver bars 4 adjacent the surface of the nitrate solution 4a and reacts with the metal to form silver nitrate solution. The continuous formation of this fresh nitrate solution, adjacent the surface of the liquid in the tower 1, forces this liquid out of the tower 1 and along the outlet pipe 12 leading therefrom and up the rising portion 12a of the pipe 12 from which it is delivered to the auxiliary tube 13. The nitrate solution formed by the aforesaid reaction together with any unreacted nitric acid is thus continually forced gradually downwardly by the fresh nitrate continually being formed adjacent the surface of the solution in the tower 1 and passes over the whole of the column of silver 4 and out through the said outlet pipe 12, any unreacted acid being thereby substantially entirely converted to the nitrate before reaching the end of the column. After the reaction has proceeded for some time, all the nitrate solution originally surrounding the metal bars will have been displaced and the solution flowing into the tube 13 will then consist substantially entirely of silver nitrate solution formed as a result of the reaction. Any nitric acid, which may have been regenerated from the nitrogen oxide fumes evolved, will mix with the freshly entering nitric acid at the upper end of the column and react therewith on the metal.

When the solution commences to flow into the tube 13, oxygen is passed up into the said tube through the aforesaid pipe 20. The oxygen flows through the tube 13 and passes through the pipe 22 into the reaction tower 1, entraining with it traces of nitrogen oxides present in the tube 13 for further use in the reaction. Any free nitric acid which may be contained in the solution entering the tube, and some of the nitrous acid, which will be converted in the presence of the oxygen to nitric acid, will act on the granulated silver in the tube 13 to form additional nitrate.

In this way substantially the whole of the acid is utilised in the reaction and a concentrated relatively low acidity nitrate solution is collected in the collecting vessel 18.

Any brown fumes of oxides of nitrogen evolved during the reaction and which have not been reconverted to nitric acid in the tower 1 and which issue through the outlet 9 at the upper end of the said tower 1 may, as stated above, be disposed of in any suitable known manner, but are preferably treated in the manner shown in Figure 2, to which reference is now directed.

In this figure the reaction tower 1 and associated parts are similar to those shown in Figure 1 and similar reference numerals are used to indicate like parts in the two figures. For the purpose of disposing of any unregenerated brown fumes of oxides of nitrogen produced in the reaction tower 1 during the reaction, an absorption tower 23 is provided, the upper end of which is provided with a cover 24 having therein an opening 25, to which cover is bolted one end of a conduit 27, the other end of which communicates with the aforesaid outlet 9 adjacent the upper end of the reaction tower.

The absorption tower 23 is partly filled with an inert material 28 such as quartz. A pipe 29 is provided in the conduit 27 for admitting distilled water to the tower 23. The bottom of the absorption tower 23 is inwardly flanged at 30 to provide an aperture 31, opening to a tubular extension 32, projecting into a collecting vessel 33, provided with an overflow pipe 34. The said aperture 31 is covered by a perforated or meshed disc 35 on which rests the inert material 28.

From the interior of the tubular extension 32 above the collecting vessel 33 extends a pipe 36 leading to a manometer 37, the end of which pipe 36 is immersed in water in the manometer 37, which is open to the atmosphere at 38.

The absorption tower 23 is surrounded by a cooling jacket 39 through which cold water is circulated.

It will now be assumed that the reaction described above is being carried out in the reaction tower 1. Any oxides of nitrogen evolved during the reaction in the reaction tower 1 and not reconverted therein to nitric acid will pass through the aforesaid conduit 27 into the absorption tower 23, where, mixed with distilled water, entering through the pipe 29, they pass over the quartz 28. The supply of oxygen to the reaction tower 1 is regulated so that only an occasional bubble passes through the manometer 37. The mixture of oxides of nitrogen, oxygen and water are thus converted into nitric acid which collects in the collecting vessel 33 and is withdrawn through the aforesaid overflow pipe 34. If desired, the nitric acid obtained may be mixed with concentrated nitric acid to provide a solution having the required specific gravity for subsequent utilisation in the reaction tower.

Whilst, in the above, a specific embodiment of the invention has been described by way of example, it will be understood by those skilled in the art that modifications may be made therein without departing from the spirit and scope of the invention, as defined by the appended claims.

What I claim is:

1. A process for the manufacture of a metal nitrate by reaction of nitric acid on a metal giving rise to the evolution of the higher oxides of nitrogen, which process comprises immersing a column of the selected metal at least partly in a solution of the nitrate of said metal maintained at a predetermined height surrounding and displaceable from said column, continuously bringing a film of nitric acid at a regulated rate into contact with the upper portion of said metal column to cause reaction of said acid with said metal with continuous formation of nitrate solution and constant evolution of a regulated amount of nitrogen oxide fumes, simultaneously continuously introducing to said reaction zone oxygen gas at a rate sufficient to replace the oxygen used in converting the evolved nitrogen oxides directly to nitric acid and to maintain the pressure in the reaction zone substantially constant, causing said reconverted nitric acid to react with said metal to increase the concentration of the nitrate solution, and continuously removing the nitrate solution as additional nitrate solution is formed.

2. The process claimed in claim 1 including the additional step of forming the entering nitric acid into a spray by impinging thereon of the stream of oxygen gas.

3. The process according to claim 1 including the additional step of bringing the removed nitrate solution into intimate contact with a stream of oxygen gas to remove any traces of free nitrous acid from said solution.

THOMAS CRITCHLEY.

REFERENCES CITED

The following references are of record in the file of this patent:

UNITED STATES PATENTS

| Number | Name | Date |
|---|---|---|
| 1,013,984 | Bosch et al. | Jan. 9, 1912 |
| 1,180,964 | Auger | Apr. 25, 1916 |
| 1,247,280 | Keller | Nov. 20, 1917 |
| 2,053,518 | Crittenden | Sept. 8, 1936 |
| 2,062,091 | Gooch | Nov. 24, 1936 |
| 2,072,947 | Folger | Mar. 9, 1937 |
| 2,206,495 | Beardsley | July 2, 1940 |

FOREIGN PATENTS

| Number | Country | Date |
|---|---|---|
| 188,868 | Great Britain | Nov. 23, 1922 |
| 413,721 | Great Britain | July 11, 1934 |

OTHER REFERENCES

Mellor, "Inorganic and Theoretical Chemistry," vol. 3, p. 459, London, Longmans, Green and Co., 1923.

Chemical and Metallurgical Engineering, vol. 53, No. 8 (August, 1946), pages 113–115.